(12) United States Patent
Chen et al.

(10) Patent No.: US 12,028,284 B2
(45) Date of Patent: Jul. 2, 2024

(54) ADAPTIVE SOUNDING REFERENCE SIGNAL PORT CONFIGURATION

(71) Applicant: QUALCOMM Incorporated, San Diego, CA (US)

(72) Inventors: Bo Chen, Beijing (CN); Chenxi Hao, Beijing (CN); Yu Zhang, San Diego, CA (US); Ruifeng Ma, Beijing (CN); Pavan Kumar Vitthaladevuni, San Diego, CA (US); Sony Akkarakaran, Poway, CA (US); Joseph Binamira Soriaga, San Diego, CA (US); Krishna Kiran Mukkavilli, San Diego, CA (US); Tingfang Ji, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/595,542

(22) PCT Filed: May 28, 2020

(86) PCT No.: PCT/CN2020/092770
§ 371 (c)(1),
(2) Date: Nov. 18, 2021

(87) PCT Pub. No.: WO2020/248821
PCT Pub. Date: Dec. 17, 2020

(65) Prior Publication Data
US 2022/0216963 A1 Jul. 7, 2022

(30) Foreign Application Priority Data

Jun. 12, 2019 (WO) ................ PCT/CN2019/090887

(51) Int. Cl.
*H04L 5/00* (2006.01)
*H04L 25/02* (2006.01)

(52) U.S. Cl.
CPC .......... *H04L 5/0048* (2013.01); *H04L 5/0087* (2013.01); *H04L 5/0091* (2013.01); *H04L 25/0228* (2013.01); *H04L 25/0248* (2013.01)

(58) Field of Classification Search
CPC . H04L 25/0228; H04L 25/0248; H04L 5/001; H04L 5/0023; H04L 5/0048; H04L 5/0064; H04L 5/0087; H04L 5/0091
See application file for complete search history.

(56) References Cited

U.S. PATENT DOCUMENTS

2013/0303199 A1\* 11/2013 Siomina ................ H04W 24/10
455/456.5
2018/0167933 A1 6/2018 Yin et al.
(Continued)

FOREIGN PATENT DOCUMENTS

CN 103905104 A 7/2014
CN 109391304 A 2/2019
(Continued)

OTHER PUBLICATIONS

International Search Report and Written Opinion—PCT/ CN2019/ 090887—ISA/EPO—dated Mar. 13, 2020.
(Continued)

*Primary Examiner* — Mansour Oveissi
(74) *Attorney, Agent, or Firm* — QUALCOMM Incorporated

(57) ABSTRACT

Various aspects of the present disclosure generally relate to wireless communication. In some aspects, a user equipment (UE) may receive a sounding reference signal (SRS) configuration that indicates a maximum number of SRS ports and whether the UE is permitted to determine an actual
(Continued)

number of SRS ports to be used for SRS transmission that is different from the maximum number of SRS ports. The UE may determine the actual number of SRS ports to be used for SRS transmission based at least in part on the SRS configuration. The UE may transmit one or more SRSs using the actual number of SRS ports. Numerous other aspects are provided.

30 Claims, 10 Drawing Sheets

(56) References Cited

U.S. PATENT DOCUMENTS

| | | | | |
|---|---|---|---|---|
| 2019/0140876 | A1* | 5/2019 | Yoshimura | H04B 1/00 |
| 2019/0174466 | A1 | 6/2019 | Zhang et al. | |
| 2019/0190669 | A1* | 6/2019 | Park | H04W 56/001 |
| 2019/0372732 | A1* | 12/2019 | Faxér | H04B 7/0691 |
| 2020/0336340 | A1* | 10/2020 | Qin | H04B 7/0617 |
| 2021/0013936 | A1* | 1/2021 | Zhu | H04B 7/0608 |
| 2021/0058274 | A1* | 2/2021 | Osawa | H04B 7/0456 |
| 2021/0084655 | A1* | 3/2021 | Estevez | H04W 74/0833 |

FOREIGN PATENT DOCUMENTS

| | | |
|---|---|---|
| CN | 109873663 A | 6/2019 |
| WO | 2018127781 A1 | 7/2018 |
| WO | 2018194436 A1 | 10/2018 |
| WO | 2019098800 A1 | 5/2019 |

OTHER PUBLICATIONS

International Search Report and Written Opinion—PCT/CN2020/092770—ISA/EPO—dated Aug. 27, 2020.
Zte, et al., "Remaining Details on PT-RS", 3GPP TSG RAN WG 1 Meeting #91, R1-1719543, Dec. 1, 2017 (Dec. 1, 2017), 8 pages, p. 3.
Ericsson: "On Full Power UL Transmission", 3GPP TSG RAN WG1 Meeting #97, R1-1907184, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, 23 Pages, May 4, 2019, XP051709210, p. 5, paragraph 2.3, p. 7, paragraph 2.4, Proposal 1, p. 7, Proposal 2, p. 8, p. 19, paragraph 4, p. 21, paragraph 5, the whole document.
Supplementary European Search Report—EP20822995—Search Authority—The Hague—dated Jun. 5, 2023.

* cited by examiner

ADAPTIVE SOUNDING REFERENCE SIGNAL PORT CONFIGURATION

CROSS-REFERENCE TO RELATED APPLICATIONS

This Patent Application is a 371 national stage of PCT Application No. PCT/CN2020/092770 filed on May 28, 2020, entitled "ADAPTIVE SOUNDING REFERENCE SIGNAL PORT CONFIGURATION," which claims priority to Patent Cooperation Treaty (PCT) Application No. PCT/CN2019/090887, filed on Jun. 12, 2019, entitled "ADAPTIVE SOUNDING REFERENCE SIGNAL PORT CONFIGURATION," which are hereby expressly incorporated by reference herein.

FIELD OF THE DISCLOSURE

Aspects of the present disclosure generally relate to wireless communication and to techniques and apparatuses for adaptive sounding reference signal port configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a sounding reference signal (SRS) configuration that indicates a maximum number of SRS ports and whether the UE is permitted to determine an actual number of SRS ports to be used for SRS transmission that is different from the maximum number of SRS ports; determining the actual number of SRS ports to be used for SRS transmission based at least in part on the SRS configuration; and transmitting one or more SRSs using the actual number of SRS ports.

In some aspects, a method of wireless communication, performed by a base station, may include transmitting, to a UE, an SRS configuration that indicates a maximum number of SRS ports allowed for the UE and that the UE is permitted to determine an actual number of SRS ports to be used for SRS transmission that is different from the maximum number of SRS ports; determining whether one or more SRS symbols overlap with one or more physical uplink control channel (PUCCH) symbols; and transmitting, to the UE, an indication of whether to transmit a rank indicator (RI) report based at least in part on whether the one or more SRS symbols overlap with the one or more PUCCH symbols.

In some aspects, a UE for wireless communication may include memory and one or more processors operatively coupled to the memory. The memory and the one or more processors may be configured to receive an SRS configuration that indicates a maximum number of SRS ports and whether the UE is permitted to determine an actual number of SRS ports to be used for SRS transmission that is different from the maximum number of SRS ports; determine the actual number of SRS ports to be used for SRS transmission based at least in part on the SRS configuration; and transmit one or more SRSs using the actual number of SRS ports.

In some aspects, a base station for wireless communication may include memory and one or more processors operatively coupled to the memory. The memory and the one or more processors may be configured to transmit, to a UE, an SRS configuration that indicates a maximum number of SRS ports allowed for the UE and that the UE is permitted to determine an actual number of SRS ports to be used for SRS transmission that is different from the maximum number of SRS ports; determine whether one or more SRS symbols overlap with one or more PUCCH symbols; and transmit, to the UE, an indication of whether to transmit an RI report based at least in part on whether the one or more SRS symbols overlap with the one or more PUCCH symbols.

In some aspects, a non-transitory computer-readable medium may store one or more instructions for wireless communication. The one or more instructions, when executed by one or more processors of a UE, may cause the one or more processors to: receive an SRS configuration that indicates a maximum number of SRS ports and whether the UE is permitted to determine an actual number of SRS ports to be used for SRS transmission that is different from the maximum number of SRS ports; determine the actual number of SRS ports to be used for SRS transmission based at least in part on the SRS configuration; and transmit one or more SRSs using the actual number of SRS ports.

In some aspects, a non-transitory computer-readable medium may store one or more instructions for wireless communication. The one or more instructions, when executed by one or more processors of a base station, may cause the one or more processors to: transmit, to a UE, an SRS configuration that indicates a maximum number of SRS ports allowed for the UE and that the UE is permitted to determine an actual number of SRS ports to be used for SRS transmission that is different from the maximum number of SRS ports; determine whether one or more SRS symbols overlap with one or more PUCCH symbols; and transmit, to the UE, an indication of whether to transmit an RI report based at least in part on whether the one or more SRS symbols overlap with the one or more PUCCH symbols.

In some aspects, an apparatus for wireless communication may include means for receiving an SRS configuration that indicates a maximum number of SRS ports and whether the apparatus is permitted to determine an actual number of SRS ports to be used for SRS transmission that is different from the maximum number of SRS ports; means for determining the actual number of SRS ports to be used for SRS transmission based at least in part on the SRS configuration; and means for transmitting one or more SRSs using the actual number of SRS ports.

In some aspects, an apparatus for wireless communication may include means for transmitting, to a UE, an SRS configuration that indicates a maximum number of SRS ports allowed for the UE and that the UE is permitted to determine an actual number of SRS ports to be used for SRS transmission that is different from the maximum number of SRS ports; means for determining whether one or more SRS symbols overlap with one or more PUCCH symbols; and means for transmitting, to the UE, an indication of whether to transmit an RI report based at least in part on whether the one or more SRS symbols overlap with the one or more PUCCH symbols.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
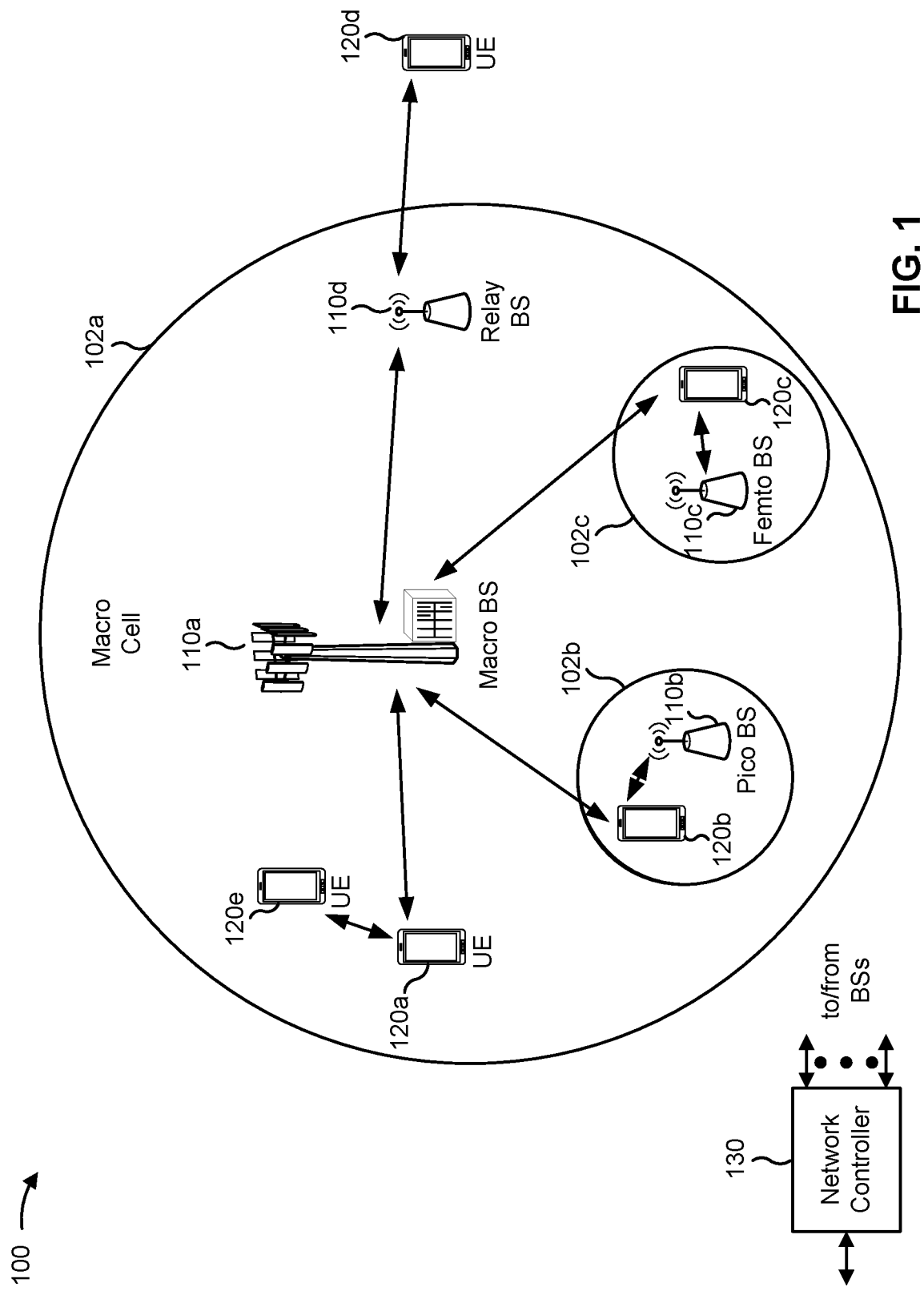
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
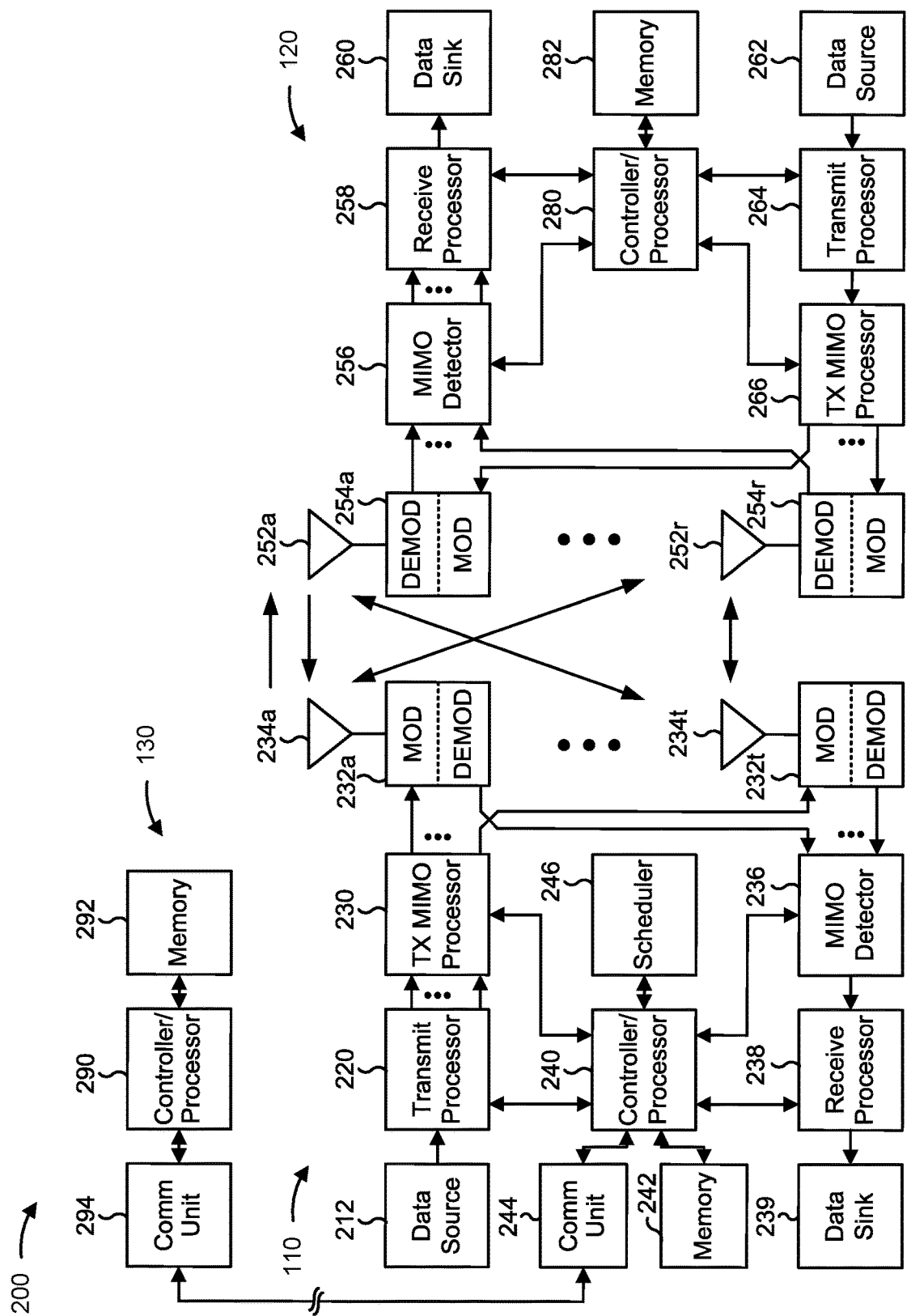
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with adaptive sounding reference signal port configuration, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a sounding reference signal (SRS) configuration that indicates a maximum number of SRS ports and whether the UE 120 is permitted to determine an actual number of SRS ports to be used for SRS transmission that is different from the maximum number of SRS ports; means for determining the actual number of SRS ports to be used for SRS transmission based at least in part on the SRS configuration; means for transmitting one or more SRSs using the actual number of SRS ports; and/or the like. In some aspects, such means may include one or more components of UE 120 described in connection with FIG. 2.

In some aspects, base station 110 may include means for transmitting, to a UE, an SRS configuration that indicates a maximum number of SRS ports allowed for the UE and that the UE is permitted to determine an actual number of SRS ports to be used for SRS transmission that is different from the maximum number of SRS ports; means for determining whether one or more SRS symbols overlap with one or more physical uplink control channel (PUCCH) symbols; and means for transmitting, to the UE, an indication of whether to transmit a rank indicator (RI) report based at least in part on whether the one or more SRS symbols overlap with the one or more PUCCH symbols; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
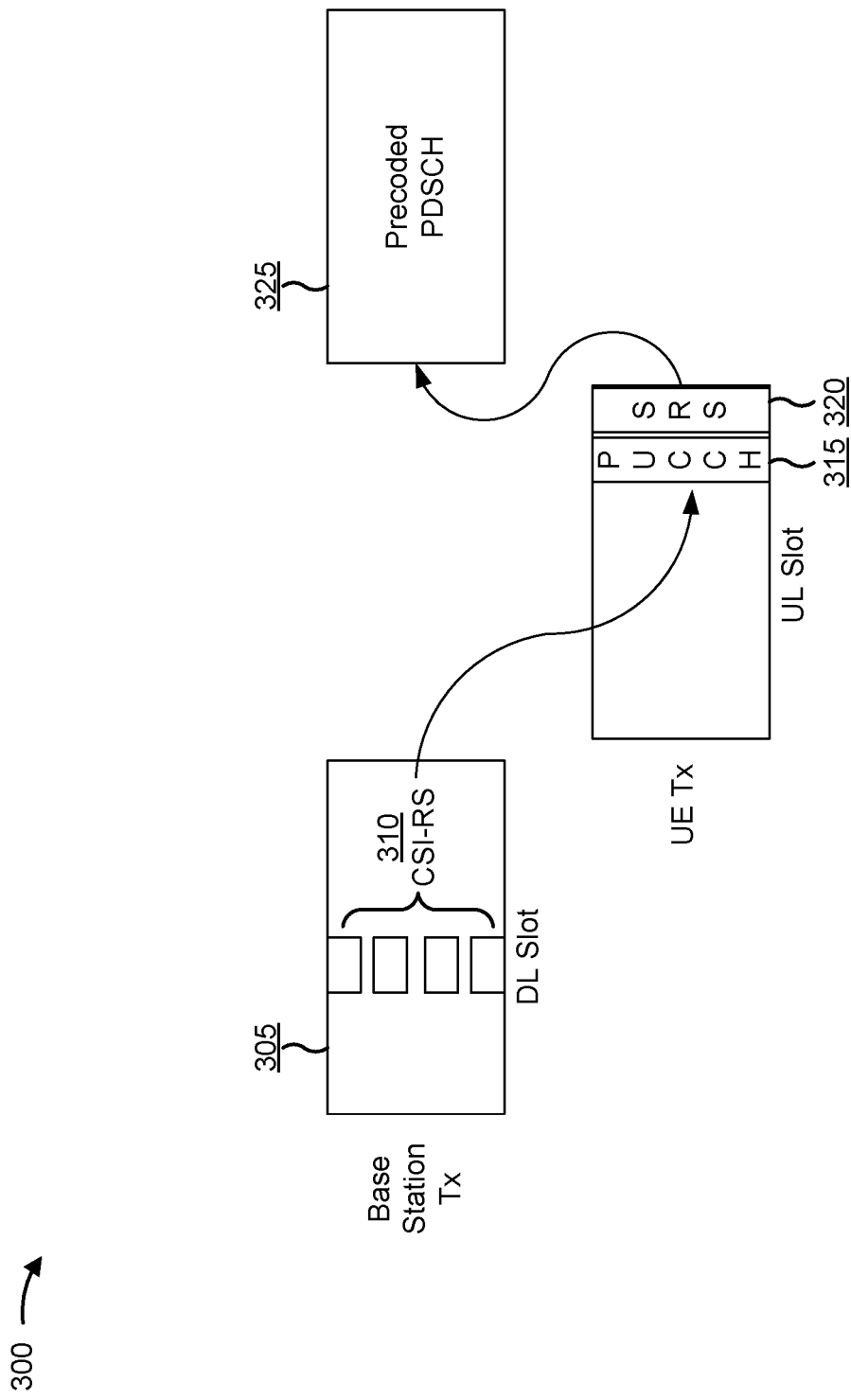
FIG. 3 is a diagram illustrating an example of a channel state feedback mechanism that supports hybrid channel state feedback, in accordance with various aspects of the present disclosure.

FIG. 3 is a diagram illustrating an example 300 of a channel state feedback mechanism that supports hybrid channel state feedback, in accordance with various aspects of the present disclosure.

As shown by reference number 305, a base station may transmit a set of downlink reference signals, shown as a set of channel state information reference signals (CSI-RSs) 310, in a downlink slot. A UE may receive and measure the set of CSI-RSs 310 to determine a transmission rank and/or a channel quality. For example, the UE may perform channel estimation (e.g., H*B) across precoded CSI-RS ports to determine an RI value and/or a channel quality indicator (QCI) value. For channel estimation, H indicates the downlink channel and B indicates the precoder used for downlink CSI-RS(s). Thus, H*B may represent a channel estimate measured from the precoded CSI-RS port(s).

The UE may transmit an indication of the RI value and/or the CQI value on an uplink control channel 315, shown as a PUCCH. In some cases, the UE may use the channel estimate H*B to determine a singular value decomposition (SVD) of a precoded channel. For example, the UE may calculate an eigenvector corresponding to the SVD of a matrix combination corresponding to the channel estimate H*B. In some aspects, the UE may calculate eigenvectors and a precoding matrix indicator (PMI) from the channel estimate. For example, the UE may determine a right eigenvector D, a left eigenvector U (sometimes referred to as a spatial domain transmission filter U, a linear receiver U, and/or the like), and a PMI V based at least in part on the channel estimate. The PMI may correspond to the RI value and the CQI value determined by the UE. The UE may indicate the RI value and the CQI value in the uplink control channel 315 (e.g., the PUCCH), and may indicate the calculated PMI V using one or more sounding reference signals (SRSs) 320.

In some aspects, the UE may transmit one or more SRSs 320 that indicate a precoding matrix associated with the determined RI and CQI. For example, the UE may precode an SRS using the left eigenvector U (e.g., a linear receiver, a spatial domain transmission filter, and/or the like). The base station may use the left eigenvector U to derive and/or estimate the precoder V (e.g., the PMI V) corresponding to the RI value and/or the CQI value. As shown by reference number 325, the base station may use the estimated precoder (e.g., beam) to transmit a data communication to the UE, such as a physical downlink shared channel (PDSCH) communication.

Thus, when a UE reports hybrid analog channel state feedback (CSF) (sometimes referred to as analog CSF), the UE reports an RI value and/or a CQI value in a PUCCH communication, and the UE precodes SRS(s) using a precoder matrix U (e.g., a left eigenvector, a spatial domain transmission filter, a linear receiver, and/or the like). Because the precoder matrix U is determined from a set of downlink CSI-RSs received from the base station, the UE should be configured with an association between the SRS resource set to be used to transmit SRS(s) precoded using the precoder matrix U (e.g., SRS(s) for reporting analog CSF) and the set of downlink CSI-RSs to be used to determine the precoder matrix U. With this configuration, the UE can determine the precoder matrix U from the associated set of downlink CSI-RSs and can use the precoder matrix U to precode the SRS(s) transmitted on the SRS resource set, and the base station can properly derive the PMI from the precoded SRS(s).

In some cases, a base station may configure a UE with a number of SRS ports to be used by the UE to transmit SRS(s). The UE may be required to transmit SRSs on all of the configured SRS ports (e.g., one SRS per configured SRS port). For example, if the base station configures two SRS ports for the UE, then the UE is required to transmit a first SRS on a first SRS port and a second SRS on a second SRS port. Similarly, if the base station configures four SRS ports for the UE, then the UE is required to transmit a first SRS on a first SRS port, a second SRS on a second SRS port, a third SRS on a third SRS port, and a fourth SRS on a fourth SRS port. In this case, the actual number of SRS ports used by the UE to transmit SRS(s) is required to be the same as the configured number of SRS ports.

However, in some cases, the UE may not need to transmit SRS(s) on every configured SRS port. For example, when SRS is used for analog CSF (e.g., when one or more SRSs are precoded using a precoder U), as described above, the UE may only need to report a subset of columns of the precoder U (e.g., with one column being reported per SRS), which may be less than the number of configured ports. For example, the UE may be configured by the base station to use four SRS ports (e.g., for uplink channel measurements), but may only need to use two SRS ports for analog CSF (e.g., for an RI value of two) to permit the base station to derive the PMI value. There may be other cases where SRS is not used to sound an uplink channel, and is used for some other purpose that does not require the UE to transmit SRS(s) on every configured SRS port.

Some techniques and apparatuses described herein permit a UE to transmit SRS(s) using fewer than all configured SRS ports. In this way, signaling overhead may be reduced. In some cases, SRS ports that are not used for SRS transmissions may be repurposed for other transmissions (e.g., data transmissions, control transmissions, and/or the like), thereby increasing throughput, reducing latency, and improving network performance. Furthermore, because a base station may be able to derive an RI value from the number of SRS ports on which SRS transmissions occur, some techniques and apparatuses described herein may permit a UE to forgo transmission of an RI value, thereby conserving network resources and resources of the UE (e.g., processing resources, memory resources, and/or the like) that would otherwise be used to generate and/or transmit the RI value.

As indicated above, FIG. 3 is provided as an example. Other examples may differ from what is described with respect to FIG. 3.

Figure 4:
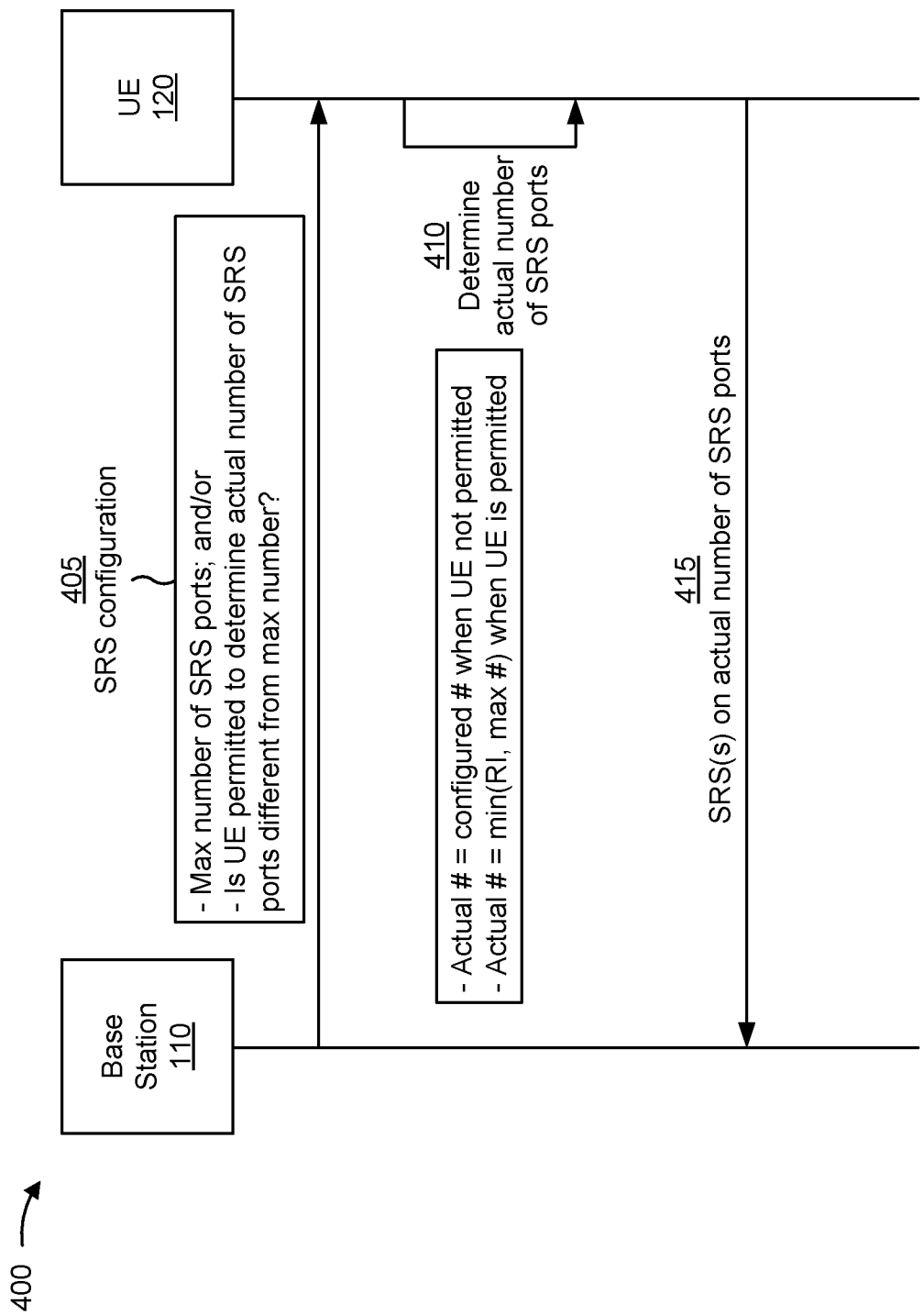
FIGS. 4-8 are diagrams illustrating examples of adaptive sounding reference signal port configuration, in accordance with various aspects of the present disclosure.

FIG. 4 is a diagram illustrating an example 400 of adaptive sounding reference signal port configuration, in accordance with various aspects of the present disclosure. As shown in FIG. 4, a base station 110 and a UE 120 may communicate with one another.

As shown by reference number 405, the base station 110 may transmit, and the UE 120 may receive, an SRS configuration. In some aspects, the SRS configuration may be transmitted in a radio resource control (RRC) message, such as an RRC configuration message, an RRC reconfiguration message, and/or the like. For example, the SRS configuration may be a higher layer parameter (e.g., SRS-Config) included in the RRC message.

As shown, the SRS configuration may indicate a maximum number of SRS ports for the UE 120, which may be referred to using the variable M The maximum number of SRS ports may indicate the maximum number of SRS ports that can be used by the UE 120 to transmit SRS(s) per SRS resource (e.g., per time domain resource, such as a symbol). The maximum number of SRS ports indicated in the SRS configuration may be, for example, one SRS port, two SRS ports, four SRS ports, and/or the like. Additionally, or alternatively, the SRS configuration may indicate whether the UE 120 is permitted to determine an actual number of SRS ports, to be used for SRS transmission (e.g., of one or more SRSs), that is different from the maximum number of SRS ports. In some aspects, this indication may include a single bit, where a first value of the bit (e.g., 1) indicates that the UE 120 is permitted to determine an actual number of SRS ports that is different from the maximum number of SRS ports, and a second value of the bit (e.g., 0) indicates that the UE 120 is not permitted to determine an actual number of SRS ports that is different from the maximum number of SRS ports.

The actual number of SRS ports may refer to a number of SRS ports actually used by the UE 120 to transmit SRS(s), and may be referred to using the variable T. In some aspects, the ability to determine (and/or use) an actual number of SRS ports that is different from the maximum number of SRS ports may be referred to as adaptive SRS port configuration or dynamic SRS port configuration. In some aspects, the actual number of SRS ports may be different from the maximum number of SRS ports for an indicated SRS usage, such as an analog CSF usage (e.g., transmission of SRS precoded using a spatial domain transmission filter U, as described above in connection with FIG. 3).

As shown by reference number 410, the UE 120 may determine an actual number of SRS ports to be used for SRS transmission based at least in part on the SRS configuration. As shown, if the SRS configuration indicates that the UE 120 is not permitted to determine an actual number of SRS ports that is different from the maximum number of SRS ports, then the UE 120 may determine an actual number of SRS ports, for an SRS resource set, that is equal to a configured number of SRS ports for the SRS resource set (e.g., indicated in the SRS configuration). For example, the SRS configuration may indicate a number of SRS ports to be used for an SRS resource set (e.g., 1, 2, 4, and/or the like). In some aspects, the number of SRS ports may be indicated using a number of SRS ports parameter (e.g., nrofSRS-Ports) for an SRS resource. If the UE 120 is not permitted to determine an actual number of SRS ports that is different from the maximum number of SRS ports, then the UE 120 may transmit SRS(s), for an SRS resource set, using the number of SRS ports indicated for that SRS resource set.

As further shown, if the SRS configuration indicates that the UE 120 is permitted to determine an actual number of SRS ports that is different from the maximum number of SRS ports, then the UE 120 may determine an actual number of SRS ports based at least in part on the maximum number of SRS ports (e.g., indicated in the SRS configuration) and an RI value determined by the UE 120. The UE 120 may determine the RI value based at least in part on measuring one or more downlink CSI-RSs, as described above in connection with FIG. 3. In some aspects, the SRS configuration may indicate an association between the one or more downlink CSI-RSs and an SRS resource set for which the actual number of SRS ports is being determined. The UE 120 may measure the indicated downlink CSI-RS(s) to determine the RI value. As shown, in some aspects, such as when one or more SRS transmissions are muted, the UE 120 may set the actual number of SRS ports equal to the minimum value of the maximum number of SRS ports and the RI value (e.g., $T=\min(RI, M)$). Alternatively, in some aspects, such as when one or more SRS transmissions are repeated, the UE 120 may set the actual number of SRS ports equal to the maximum value of the maximum number of SRS ports and the RI value (e.g., $T=\max(RI, M)$). The actual number of SRS ports may be, for example, one SRS port, two SRS ports, three SRS ports, four SRS ports, and/or the like.

As shown by reference number 415, the UE 120 may transmit one or more SRSs using the actual number of SRS ports. For example, the UE 120 may transmit the SRS(s), for an SRS resource set, using one or more time domain resources configured for the SRS resource set (e.g., in the SRS configuration), using one or more frequency domain resources configured for the SRS resource set (e.g., in the SRS configuration), and/or the like. In some aspects, the UE 120 may transmit a single SRS per SRS port.

In some aspects, the UE 120 may transmit SRS(s) on the SRS ports using the same transmit power for each SRS port. In this case, the UE 120 may determine the transmit power to be used for each SRS port on which SRS(s) are actually transmitted by dividing the total (e.g., maximum) SRS transmit power by the actual number of SRS ports (e.g., Tx power per SRS port=Total SRS Tx power/T). If the actual number of SRS ports is less than the maximum number of SRS ports, then the UE 120 may mute SRS transmission(s) on one or more SRS ports (e.g., on M minus T ports). Additionally, or alternatively, if the actual number of SRS ports is less than the maximum number of SRS ports, then the UE 120 may use one or more configured SRS resources (e.g., time domain resources, frequency domain resources, and/or the like) to transmit uplink communication(s) other than an SRS using the SRS ports that are not used for SRS transmission (e.g., that are muted for SRS transmission). For example, the UE 120 may transmit an uplink data communication (e.g., a physical uplink shared channel (PUSCH) communication), an uplink control communication (e.g., a PUCCH communication), an uplink reference signal other than SRS (e.g., a demodulation reference signal (DMRS)), and/or the like on the muted SRS ports. In some aspects, if the actual number of SRS ports is equal to the maximum number of SRS ports, then the UE 120 may repeat SRS transmission(s) on one or more SRS ports (e.g., on M minus T ports).

In some aspects, the UE 120 may transmit, to the base station 110, a UE capability regarding a number of transmit antennas of the UE 120 and a number of receive antennas of the UE 120, sometimes referred to as an antenna switching capability, an SRS antenna switching capability, and/or the like. For example, the UE 120 may indicate the capability using a supportedSRS-TxPortSwitch parameter in a UE capability report. In some aspects, the base station 110 may use this UE capability to determine the maximum number of SRS ports and/or other SRS parameters (e.g., a number of SRS resources, a time domain configuration for the SRS resources, and/or the like) to be indicated in the SRS configuration.

In some aspects, the UE 120 may report a UE capability that indicates that a number of transmit antennas of the UE 120 is equal to a number of receive antennas of the UE 120. For example, the SRS antenna switching capability may indicate that the UE 120 has one transmit antenna and one receive antenna (e.g., t1r1 or 1T=1R), may indicate that the UE 120 has two transmit antennas and two receive antennas (e.g., t2r2 or 2T=2R), may indicate that the UE 120 has four transmit antennas and four receive antennas (e.g., t4r4 or 4T=4R), and/or the like. If the base station 110 receives an indication of this capability, then the base station 110 may configure (e.g., in the SRS configuration) the maximum number of SRS ports to be equal to the number of transmit antennas of the UE 120 and to be equal to the number of receive antennas of the UE 120 (e.g., because the number of transmit antennas is the same as the number of receive antennas). In some aspects, the base station 110 may indicate the maximum number of SRS ports (e.g., per SRS resource, such as a time domain resource), in the SRS configuration, using a number of SRS ports parameter (e.g., nrofSRS-Ports) for an SRS resource. In some aspects, the base station 110 may configure a single SRS resource per SRS resource set. As described above, the UE 120 may determine an actual number of SRS ports that is less than or equal to the maximum number of SRS ports (e.g., as indicated by the number of SRS ports parameter for the SRS resource).

In some aspects, the UE 120 may report a UE capability that indicates that a number of transmit antennas of the UE 120 is less than a number of receive antennas of the UE 120. For example, the SRS antenna switching capability may indicate that the UE 120 has one transmit antenna and two receive antennas (e.g., t1r2 or 1T2R), may indicate that the UE 120 has two transmit antennas and four receive antennas (e.g., t2r4 or 2T4R), may indicate that the UE 120 has one transmit antenna and four receive antennas (e.g., t1r4 or 1T4R), may indicate that the UE 120 can switch between one or two transmit antennas and that the UE 120 has four receive antennas (e.g., t1r4-t2r4 or 1T4R/2T4R), and/or the like. If the base station 110 receives an indication of this capability, then the base station 110 may configure (e.g., in the SRS configuration) a number of SRS resources, in an SRS resource set, that is equal to the maximum number of SRS ports. For example, the base station 110 may configure the UE 120 with M SRS resources (e.g., M symbols for SRS transmission). In some aspects, the M SRS resources may be configured in a same slot, as described in more detail below in connection with FIG. 5. Alternatively, the M SRS resources may be configured in different slots (e.g., two slots), as described in more detail below in connection with FIG. 6.

By permitting a UE 120 to transmit SRS(s) using fewer than all configured SRS ports, signaling overhead may be reduced and resources of the UE 120 (e.g., processing resources, memory resources, battery power, and/or the like) may be conserved. Furthermore, this may permit proper indication of analog CSF with reduced ambiguity. In some cases, SRS ports that are not used for SRS transmissions may be repurposed for other transmissions (e.g., data transmissions, control transmissions, and/or the like), thereby increasing throughput, reducing latency, and improving network performance.

As indicated above, FIG. 4 is provided as an example. Other examples may differ from what is described with respect to FIG. 4.

Figure 5:
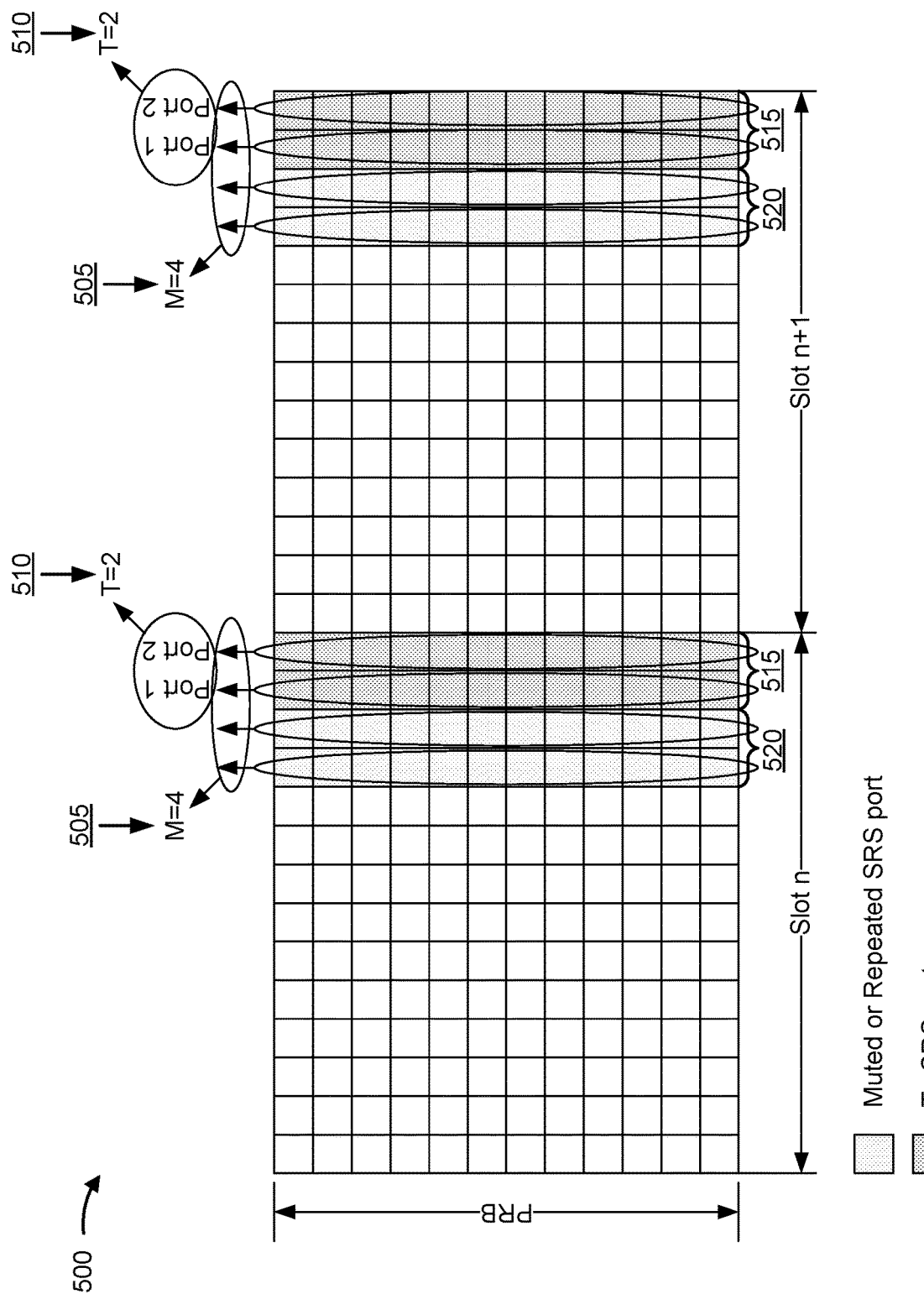

FIG. 5 is a diagram illustrating another example 500 of adaptive sounding reference signal port configuration, in accordance with various aspects of the present disclosure.

As described above in connection with FIG. 4, in some aspects, a UE 120 may report a UE capability that indicates that a number of transmit antennas of the UE 120 is less than a number of receive antennas of the UE 120. In this case, the base station 110 may configure a number of SRS resources, in an SRS resource set, that is equal to the maximum number of SRS ports. For example, the base station 110 may configure the UE 120 with M SRS resources (e.g., M symbols for SRS transmission). In some aspects, the M SRS resources may be configured in a same slot, as shown in FIG. 5.

For example, as shown by reference number 505, the base station 110 may configure the UE 120 with a maximum of four SRS ports (shown as M=4). As shown by reference number 510, the UE 120 may determine an actual number of SRS ports equal to two (shown as T=2), which is less than the maximum number of SRS ports, as described above in connection with FIG. 4. As shown by reference number 515, the UE 120 may transmit a first SRS using a first SRS port (shown as Port 1) of the two SRS ports and may transmit a second SRS using a second SRS port (shown as Port 2) of the two SRS ports. In example 500, the UE 120 transmits the first SRS and the second SRS in the same slot (e.g., for each slot, such as slot n, slot n+1, and/or the like). In FIG. 5, the SRS ports used to actually transmit SRS(s) are shown as Tx SRS ports. As shown, the UE 120 may transmit SRS(s) on an SRS port on a set of physical resource blocks (PRBs) (e.g., frequency domain resources), which may be indicated in an SRS configuration. As shown by reference number 520, in some aspects, the UE 120 may mute SRS transmission on M minus T SRS ports (e.g., two SRS ports in example 500, shown as Muted or Repeated SRS ports).

Alternatively, the UE 120 may repeat SRS transmissions on M minus T SRS ports (e.g., two SRS ports in example 500, shown as Muted or Repeated SRS ports). In this case, the T=2 SRS transmissions shown with respect to reference number 515 may be repeated in the symbols shown with respect to reference number 520. For example, as shown by reference number 515, the UE 120 may transmit a first SRS using a first SRS port, of the two SRS ports, in a first symbol of a slot (shown as Port 1 in symbol 13), may transmit a second SRS using a second SRS port, of the two SRS ports, in a second symbol of the slot (shown as Port 2 in symbol 14), may transmit the first SRS using the first SRS port in a third symbol of the slot (e.g., repeated Port 1 in symbol 11), and may transmit the second SRS using the second SRS port in a fourth symbol of the slot (e.g., repeated Port 2 in symbol 12).

In example 500, the base station 110 configures M SRS resources (e.g., M symbols) in the same slot (e.g., for an SRS resource set). For example, the base station 110 configures different SRS resources in different symbols of the same slot. In some aspects, each SRS resource (e.g., each SRS symbol) may correspond to a different SRS port (e.g., for a total of M SRS ports configured for a slot). In this case, the UE 120 may transmit SRS(s) on T SRS resources per slot (e.g., using T SRS ports, and one SRS port for each SRS resource). This may be referred to as intra-slot SRS port selection. Alternatively, the base station 110 may configure the UE 120 for inter-slot SRS port selection, as described below in connection with FIG. 6.

As indicated above, FIG. 5 is provided as an example. Other examples may differ from what is described with respect to FIG. 5.

Figure 6:
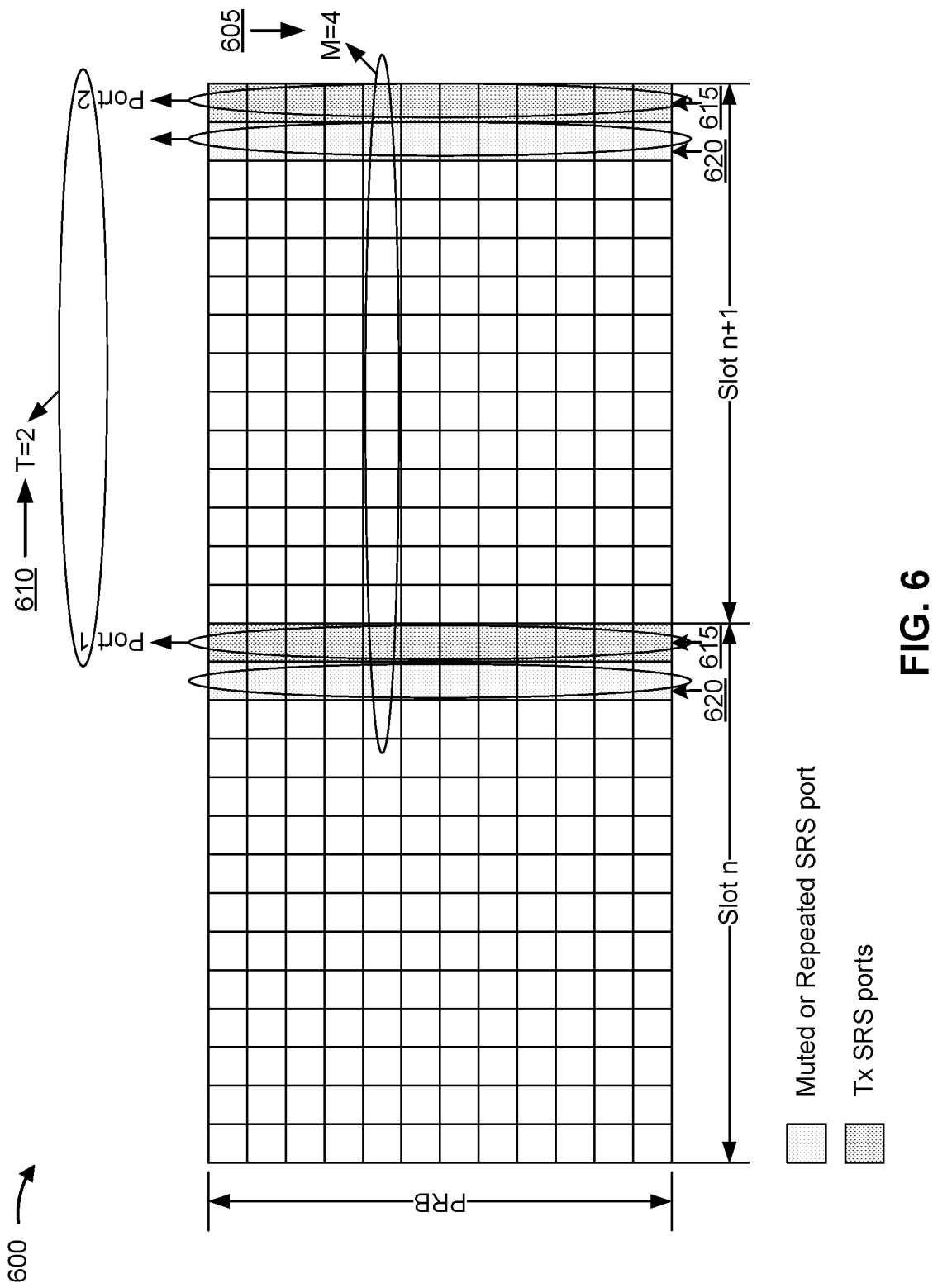

FIG. 6 is a diagram illustrating another example 600 of adaptive sounding reference signal port configuration, in accordance with various aspects of the present disclosure.

As described above in connection with FIG. 4, in some aspects, a UE 120 may report a UE capability that indicates that a number of transmit antennas of the UE 120 is less than a number of receive antennas of the UE 120. In this case, the base station 110 may configure a number of SRS resources, in an SRS resource set, that is equal to the maximum number of SRS ports. For example, the base station 110 may configure the UE 120 with M SRS resources (e.g., M symbols for SRS transmission). In some aspects, the M SRS resources may be configured in different slots (e.g., across multiple slots), as shown in FIG. 6. In example 600, the M SRS resources are configured across two slots, with M/2 SRS resources per slot. In some aspects, the M SRS resources may be configured across a different number of slots, such as four slots.

For example, as shown by reference number 605, the base station 110 may configure the UE 120 with a maximum of four SRS ports (shown as M=4). As shown by reference number 610, the UE 120 may determine an actual number of SRS ports equal to two (shown as T=2), which is less than the maximum number of SRS ports, as described above in connection with FIG. 4. As shown by reference number 615, the UE 120 may transmit a first SRS using a first SRS port (shown as Port 1) of the two SRS ports and may transmit a second SRS using a second SRS port (shown as Port 2) of the two SRS ports. In example 600, the UE 120 transmits the first SRS and the second SRS in different slots. For example, the UE 120 transmits the first SRS in slot n and transmits the second SRS in slot n+1. In example 600, the first SRS and the second SRS are transmitted in the same symbol number (e.g., the last symbol) of the different slots, but other SRS configurations may differ from example 600. As shown by reference number 620, in some aspects, the UE 120 may mute SRS transmission on M minus T SRS ports (e.g., two SRS ports in example 600, shown as Muted or Repeated SRS ports).

Alternatively, the UE 120 may repeat SRS transmissions on M minus T SRS ports (e.g., two SRS ports in example 600, shown as Muted or Repeated SRS ports). In this case, the T=2 SRS transmissions shown with respect to reference number 615 may be repeated in the symbols shown with respect to reference number 620. For example, as shown by reference number 615, the UE 120 may transmit a first SRS using a first SRS port, of the two SRS ports, in a first symbol of a slot (shown as Port 1 in symbol 13), may transmit a second SRS using a second SRS port, of the two SRS ports, in a second symbol of the slot (shown as Port 2 in symbol 14), may transmit (e.g., repeat) the first SRS using the first SRS port in a third symbol of the slot (e.g., repeated Port 1 in symbol 11), and may transmit (e.g., repeat) the second SRS using the second SRS port in a fourth symbol of the slot (e.g., repeated Port 2 in symbol 12).

In example 600, the base station 110 configures M SRS resources (e.g., M symbols) across different slots (e.g., for an SRS resource set). For example, for a maximum number of two SRS ports, the base station 110 may configure a first SRS resource in a first slot, and the base station 110 may configure a second SRS resource in a second slot. As another example, for a maximum number of four SRS ports (e.g., as shown in FIG. 6), the base station 110 may configure a first SRS resource and a second SRS resources in a first slot, and the base station 110 may configure a third SRS resource and a fourth SRS resource in a second slot. In some aspects, each SRS resource (e.g., each SRS symbol) may correspond to a different SRS port (e.g., for a total of M SRS ports configured across the different slots). In this case, the UE 120 may transmit SRS(s) on T SRS resources across the different slots (e.g., using T SRS ports, and one SRS port for each SRS resource). For example, if the base station 110 configures M SRS resources across two slots, with M/2 SRS resources per slot, then the UE 120 may transmit SRS(s) on T SRS resources across the two slots, with T/2 SRS resources per slot. This may be referred to as inter-slot SRS port selection.

As indicated above, FIG. 6 is provided as an example. Other examples may differ from what is described with respect to FIG. 6.

Figure 7:
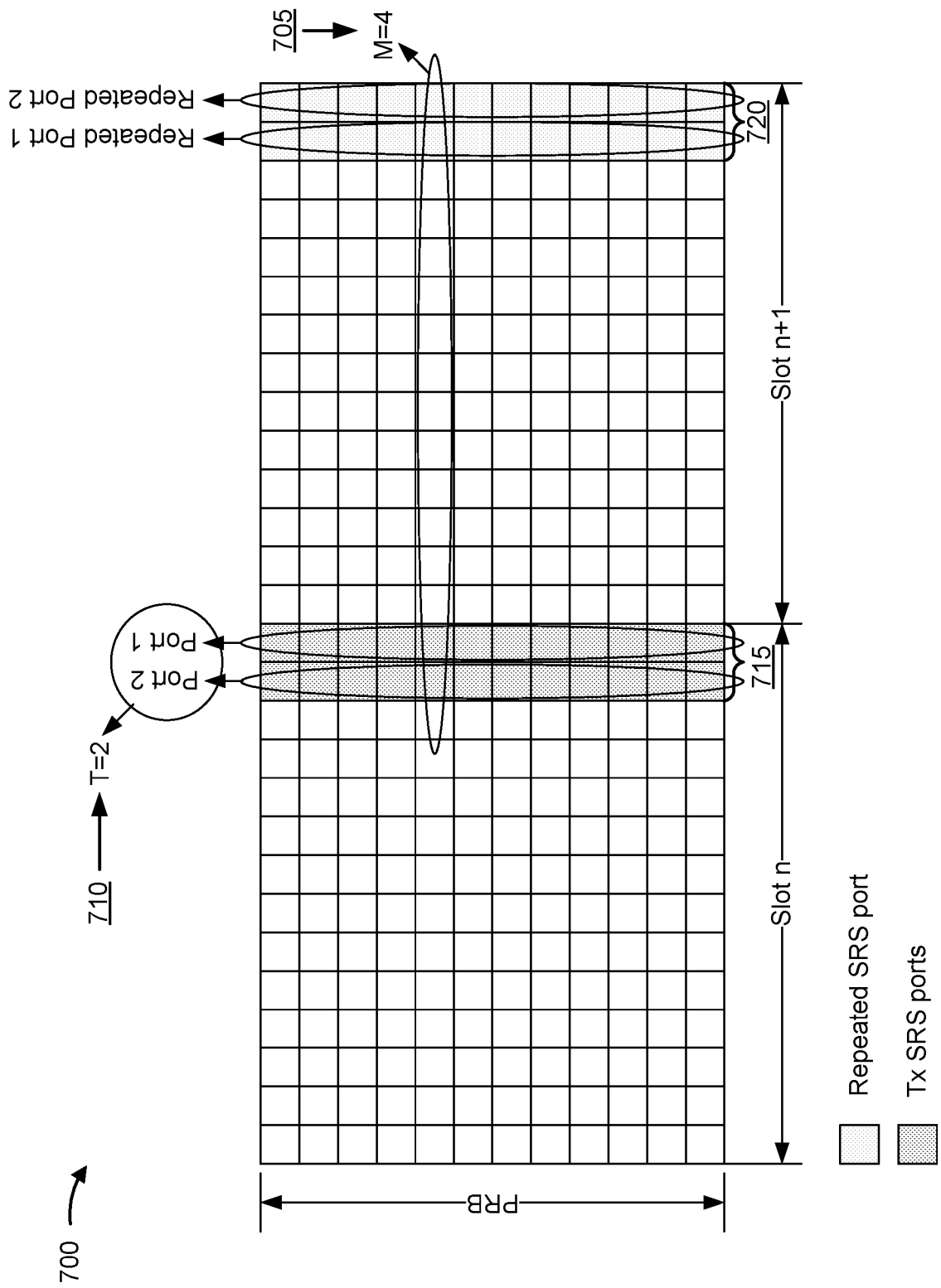

FIG. 7 is a diagram illustrating another example 700 of adaptive sounding reference signal port configuration, in accordance with various aspects of the present disclosure.

As described above in connection with FIG. 4, in some aspects, a UE 120 may report a UE capability that indicates that a number of transmit antennas of the UE 120 is less than a number of receive antennas of the UE 120. In this case, the base station 110 may configure a number of SRS resources, in an SRS resource set, that is equal to the maximum number of SRS ports. For example, the base station 110 may configure the UE 120 with M SRS resources (e.g., M symbols for SRS transmission). In some aspects, the M SRS resources may be configured in different slots (e.g., across multiple slots), as shown in FIG. 7. In example 700, the M SRS resources are configured across two slots, with M/2 SRS resources per slot. In some aspects, the M SRS resources may be configured across a different number of slots, such as four slots.

For example, as shown by reference number 705, the base station 110 may configure the UE 120 with a maximum of four SRS ports (shown as M=4). As shown by reference number 710, the UE 120 may determine an actual number of SRS ports equal to two (shown as T=2), which is less than the maximum number of SRS ports, as described above in connection with FIG. 4. As shown by reference number 715, the UE 120 may transmit a first SRS using a first SRS port (shown as Port 1) of the two SRS ports and may transmit a second SRS using a second SRS port (shown as Port 2) of the two SRS ports. In example 700, the UE 120 transmits the first SRS and the second SRS in the same slot. For example, the UE 120 transmits the first SRS and the second SRS in slot n. In example 700, the first SRS and the second SRS are transmitted in symbols 13 and 14 of the slot. Other SRS configurations may differ from example 700, and the first SRS and the second SRS may be transmitted in symbols other than symbols 13 and 14.

As shown by reference number 720, the UE 120 may repeat SRS transmissions on M minus T SRS ports (e.g., two SRS ports in example 700, shown as Repeated SRS ports). In this case, the T=2 SRS transmissions shown with respect to reference number 715 in a first slot (e.g., slot n) may be repeated in a second slot (e.g., slot n+1). For example, as shown by reference number 715, the UE 120 may transmit a first SRS using a first SRS port, of the two SRS ports, in a first symbol of a first slot (shown as Port 1 in symbol 14 of slot n) and may transmit a second SRS using a second SRS port, of the two SRS ports, in a second symbol of the slot (shown as Port 2 in symbol 13 of slot n). As shown by reference number 720, the UE 120 may transmit (e.g., repeat) the first SRS using the first SRS port in a first symbol of a second slot (e.g., repeated Port 1 in symbol 13 of slot n+1), and may transmit (e.g., repeat) the second SRS using the second SRS port in a second symbol of the second slot (e.g., repeated Port 2 in symbol 14 of slot n+1).

In example 700, the symbol number (or symbol index) used for SRS transmission on a specific port is different between the first slot and the second slot. For example, an SRS transmission on Port 1 occurs in symbol 14 of slot n and occurs in symbol 13 of slot n+1. Similarly, an SRS transmission on Port 2 occurs in symbol 13 of slot n and occurs in symbol 14 of slot n+1. In some aspects, the symbol number used for SRS transmission on a specific port may be the same across slots. For example, symbol 13 may be used for SRS transmission on Port 1 in both slot n and slot n+1. Furthermore, although example 700 shows transmissions on the T=2 ports in a first slot (slot n) and repeated transmissions on the T=2 ports in a second slot (slot n+1), in some aspects, the UE 120 may transmit on a first port (e.g., Port 1) in a first slot (e.g., slot n) and may repeat transmission on the first port in a first slot, and may transmit on a second port (e.g., Port 2) in a second slot (e.g., slot n+1) and may repeat transmission on the second port in the second slot.

In example 700, the base station 110 configures M SRS resources (e.g., M symbols) across different slots (e.g., for an SRS resource set). For example, for a maximum number of two SRS ports, the base station 110 may configure a first SRS resource in a first slot, and the base station 110 may configure a second SRS resource in a second slot. In this case, the UE may transmit SRS transmissions on only a single port in both the first slot and the second slot. As another example, for a maximum number of four SRS ports (e.g., as shown in FIG. 7), the base station 110 may configure a first SRS resource and a second SRS resource in a first slot, and the base station 110 may configure a third SRS resource and a fourth SRS resource in a second slot. In some aspects, each SRS resource (e.g., each SRS symbol) may correspond to a different SRS port (e.g., for a total of M SRS ports configured across the different slots). In this case, the UE 120 may transmit SRS(s) on T SRS resources across the different slots (e.g., using T SRS ports, and one SRS port for each SRS resource). For example, if the base station 110 configures M SRS resources across two slots, with M/2 SRS resources per slot, then the UE 120 may transmit SRS(s) on T SRS resources across the two slots, with T/2 SRS resources per slot. This may be referred to as inter-slot SRS port selection.

As indicated above, FIG. 7 is provided as an example. Other examples may differ from what is described with respect to FIG. 7.

Figure 8:
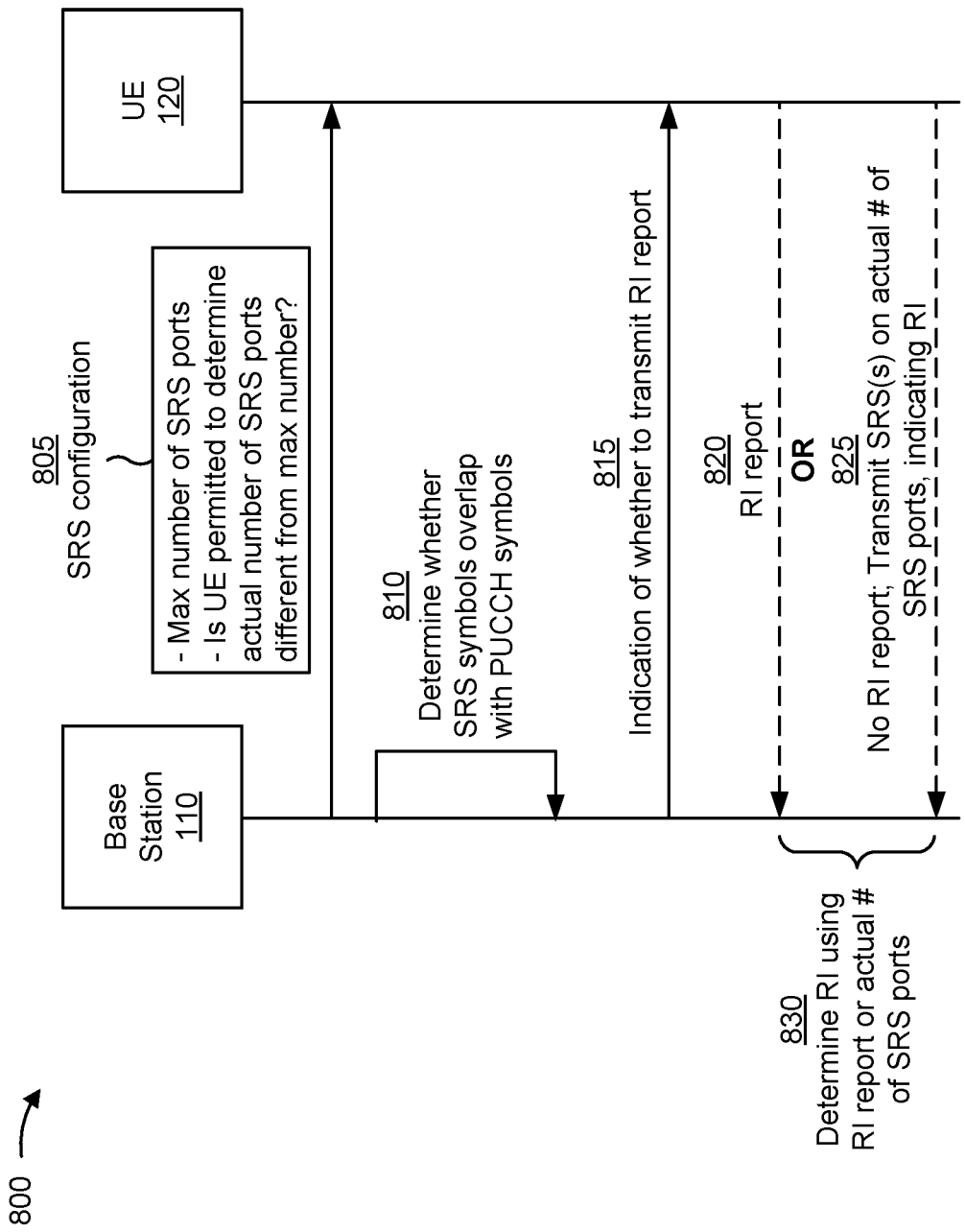

FIG. 8 is a diagram illustrating another example 800 of adaptive sounding reference signal port configuration, in accordance with various aspects of the present disclosure. As shown in FIG. 8, a base station 110 and a UE 120 may communicate with one another.

As shown by reference number 805, the base station 110 may transmit, and the UE 120 may receive, an SRS configuration, as described above in connection with FIG. 4. In some aspects, the SRS configuration may indicate, to the UE 120, whether to transmit an RI report. Alternatively, the indication of whether to transmit the RI report may be indicated in another configuration and/or another message.

As shown by reference number 810, the base station 110 may determine whether one or more SRS symbols overlap with one or more PUCCH symbols. For example, the base station 110 may identify one or more symbols configured for SRS transmission (sometimes referred to as SRS symbols), and may identify one or more symbols in which PUCCH communications are configured to be transmitted (sometimes referred to as PUCCH symbols). In some aspects, the SRS symbols and/or the PUCCH symbols may be indicated in one or more messages transmitted to the UE 120. For example, the SRS symbols may be indicated in a configuration (e.g., an SRS configuration, an RRC message, and/or the like). Additionally, or alternatively, the PUCCH symbols may be indicated in a configuration (e.g., an RRC message and/or the like), in downlink control information (DCI), and/or the like. The PUCCH symbol(s) may be part of a short PUCCH (e.g., that includes a single symbol) or a long PUCCH (e.g., that includes four symbols). The base station 110 may determine whether the identified SRS symbols overlap with the identified PUCCH symbols. The overlap may be a complete overlap (e.g., all SRS symbols overlap with corresponding PUCCH symbols) or a partial overlap (e.g., at least one of the SRS symbols overlaps with a PUCCH symbol).

As shown by reference number 815, the base station 110 may transmit, to the UE 120, an indication of whether to transmit an RI report based at least in part on whether the one or more SRS symbols overlap with the one or more PUCCH symbols. The UE 120 may selectively transmit (e.g., may transmit or may refrain from transmitting) the RI report based at least in part on the indication.

In some aspects, the base station 110 may instruct the UE 120 to transmit the RI report based at least in part on a determination that the one or more SRS symbols and the one or more PUCCH symbols overlap (e.g., one or more of the SRS symbols overlap with a PUCCH symbol, all SRS symbols overlap with a corresponding PUCCH symbol, and/or the like). For example, the base station 110 may instruct the UE 120 to transmit the RI report based at least in part on a determination that the one or more SRS symbols and the one or more PUCCH symbols occur on overlapping symbols of a same carrier (e.g., a determination that PUCCH transmissions and SRS transmissions are configured and/or scheduled on one or more overlapping symbols of the same carrier).

In the case where the base station 110 instructs the UE 120 to transmit the RI report, the UE 120 may transmit the RI report to the base station 110 (e.g., in a PUCCH communication, as described above in connection with FIG. 3), as shown by reference number 820. The UE 120 may also transmit SRS(s) on an actual number of SRS ports (e.g., which may be less than a maximum number of SRS ports configured by the base station 110), as described above in connection with FIGS. 4-7. The actual number of SRS ports used by the UE 120 may indicate the rank (e.g., may indicate an RI value) because the actual number of SRS ports may be determined as T=min(M, RI), as described above in connection with FIG. 4. However, when one or more SRS symbols overlap with a PUCCH symbol, the base station 110 may not be able to determine the actual number of SRS ports used by the UE 120. As a result, the base station 110 may not be capable of deriving the RI value from the actual number of SRS ports. Thus, in this case, the base station 110 may determine the RI value using the RI report, as shown by reference number 830.

In some aspects, the base station 110 may instruct the UE 120 not to transmit the RI report based at least in part on a determination that the one or more SRS symbols and the one or more PUCCH symbols do not overlap (e.g., none of the SRS symbols overlap with a PUCCH symbol). For example, the base station 110 may instruct the UE 120 not to transmit the RI report based at least in part on a determination that the one or more SRS symbols (e.g., all SRS symbols) are configured on a first carrier and the one or more PUCCH symbols (e.g., all PUCCH symbols) are configured on a second carrier (e.g., a determination that PUCCH transmissions and SRS transmissions are configured and/or scheduled on different carriers). Additionally, or alternatively, the base station 110 may instruct the UE 120 not to transmit the RI report based at least in part on a determination that the one or more SRS symbols and the one or more PUCCH symbols occur on non-overlapping symbols of a same carrier (e.g., a determination that PUCCH transmissions and SRS transmissions are configured and/or scheduled on separate symbols of the same carrier).

In the case where the base station 110 instructs the UE 120 not to transmit the RI report, the UE 120 may refrain from transmitting the RI report to the base station 110, as shown by reference number 825. The UE 120 may transmit SRS(s) on an actual number of SRS ports (e.g., which may be less than a maximum number of SRS ports configured by the base station 110), as described above in connection with FIGS. 4-7. As described above, the actual number of SRS ports used by the UE 120 may indicate the rank (e.g., may indicate the RI value). When the SRS symbols do not overlap with one or more PUCCH symbols, the base station 110 may be capable of determining an RI value based at least in part on the actual number of SRS ports used by the UE 120 to transmit SRS (e.g., using the techniques described above in connection with FIGS. 4-7). Thus, in this case, the base station 110 may determine the RI value using the actual number of SRS ports (e.g., using blank detection for received SRS), as shown by reference number 830. For example, the base station 110 may determine that the RI value is equal to the actual number of SRS ports.

In this way, network resources may be conserved for other communications by forgoing transmission of the RI report. In some aspects, if the actual number of SRS ports is less than the maximum number of SRS ports and the UE 120 is configured to transmit an RI report, then the UE 120 may use one or more configured SRS resources (e.g., time domain resources, frequency domain resources, and/or the like) to transmit uplink communication(s) other than an SRS using the SRS ports that are not used for SRS transmission (e.g., that are muted for SRS transmission). For example, the UE 120 may transmit an uplink data communication (e.g., a PUSCH communication), an uplink control communication (e.g., a PUCCH communication), an uplink reference signal other than SRS (e.g., a DMRS), and/or the like on the muted SRS ports when the UE 120 transmits an RI report, thereby increasing throughput, reducing latency, improving network performance, and/or the like. However, if the UE 120 does not transmit an RI report, then the UE 120 may refrain from reusing a configured SRS resource for an uplink communication other than SRS because this may prevent the base station 110 from being able to determine an actual number of SRS ports and a corresponding RI value.

As indicated above, FIG. 8 is provided as an example. Other examples may differ from what is described with respect to FIG. 8.

Figure 9:
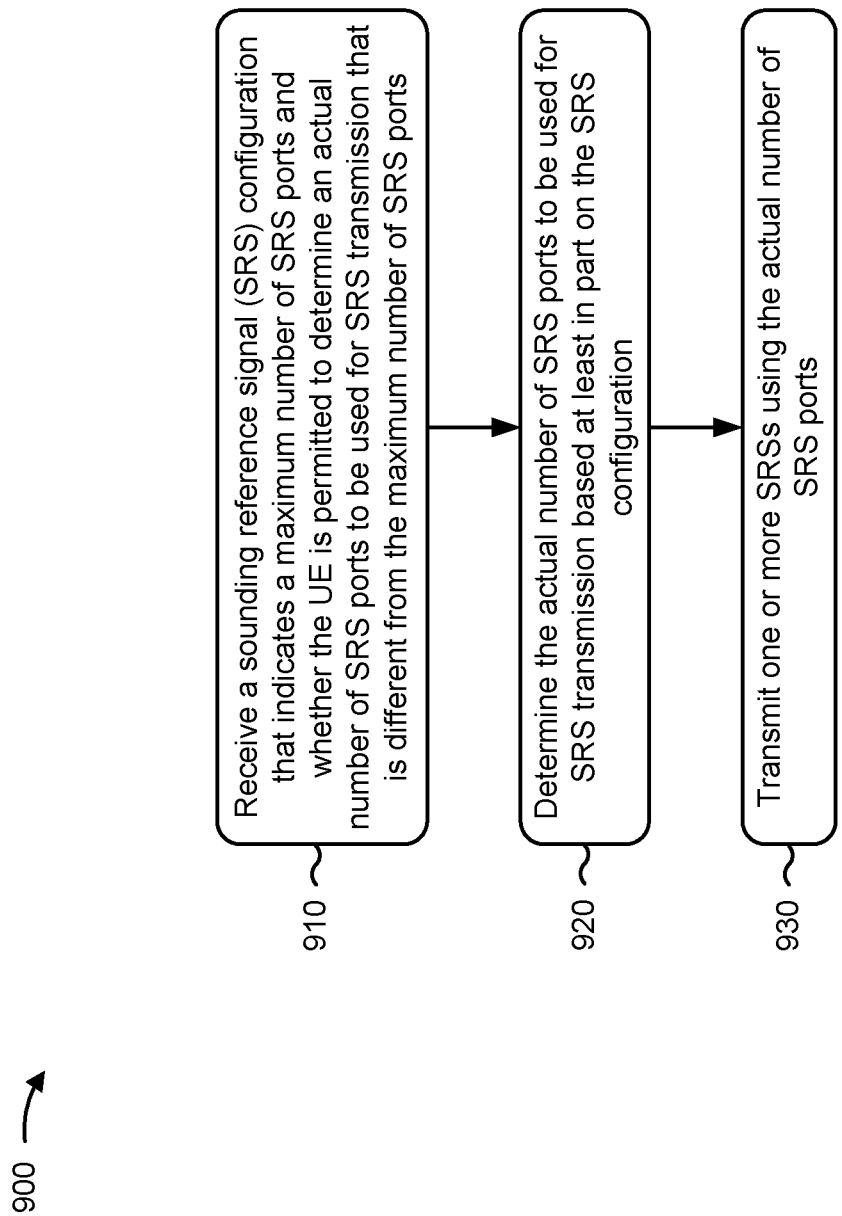
FIGS. 9 and 10 are diagrams illustrating example processes relating to adaptive sounding reference signal port configuration, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with adaptive sounding reference signal port configuration.

As shown in FIG. 9, in some aspects, process 900 may include receiving an SRS configuration that indicates a maximum number of SRS ports and whether the UE is permitted to determine an actual number of SRS ports to be used for SRS transmission that is different from the maximum number of SRS ports (block 910). For example, the UE (e.g., using receive processor 258, controller/processor 280, memory 282, and/or the like) may receive an SRS configuration that indicates a maximum number of SRS ports and whether the UE is permitted to determine an actual number of SRS ports to be used for SRS transmission that is different from the maximum number of SRS ports, as described above.

As further shown in FIG. 9, in some aspects, process 900 may include determining the actual number of SRS ports to be used for SRS transmission based at least in part on the SRS configuration (block 920). For example, the UE (e.g., using receive processor 258, transmit processor 264, controller/processor 280, memory 282, and/or the like) may determine the actual number of SRS ports to be used for SRS transmission based at least in part on the SRS configuration, as described above.

As further shown in FIG. 9, in some aspects, process 900 may include transmitting one or more SRSs using the actual number of SRS ports (block 930). For example, the UE (e.g., using transmit processor 264, controller/processor 280, memory 282, and/or the like) may transmit one or more SRSs using the actual number of SRS ports, as described above.

Process 900 may include additional aspects, such as any single aspect or any combination of aspects described below and/or in connection with one or more other processes described elsewhere herein.

In a first aspect, the actual number of SRS ports is equal to a configured number of SRS ports for an SRS resource set, indicated in the SRS configuration, if the UE is not permitted to determine an actual number of SRS ports that is different from the maximum number of SRS ports.

In a second aspect, alone or in combination with the first aspect, the actual number of SRS ports is determined based at least in part on the maximum number of SRS ports and an RI value determined by the UE.

In a third aspect, alone or in combination with one or more of the first and second aspects, the actual number of SRS ports is equal to a minimum value of the maximum number of SRS ports and the RI value.

In a fourth aspect, alone or in combination with one or more of the first through third aspects, the one or more SRSs are transmitted using a same transmit power for each of the actual number of ports.

In a fifth aspect, alone or in combination with one or more of the first through fourth aspects, SRS transmission is muted on one or more SRS ports if the actual number of SRS ports is less than the maximum number of SRS ports.

In a sixth aspect, alone or in combination with one or more of the first through fifth aspects, a UE capability indicates that a number of transmit antennas of the UE is equal to a number of receive antennas of the UE, and the maximum number of SRS ports is equal to the number of transmit antennas and is equal to the number of receive antennas.

In a seventh aspect, alone or in combination with one or more of the first through sixth aspects, the maximum number of SRS ports is indicated using a number of SRS ports parameter for an SRS resource.

In an eighth aspect, alone or in combination with one or more of the first through seventh aspects, the actual number of SRS ports is less than or equal to the number of SRS ports parameter for the SRS resource.

In a ninth aspect, alone or in combination with one or more of the first through eighth aspects, a UE capability indicates that a number of transmit antennas of the UE is less than a number of receive antennas of the UE, and the UE is configured with a number of SRS resources, in an SRS resource set, that is equal to the maximum number of SRS ports.

In a tenth aspect, alone or in combination with one or more of the first through ninth aspects, different SRS resources, of the number of SRS resources, occur in different symbols of a same slot, and the one or more SRSs are transmitted in the different SRS resources using different SRS ports.

In an eleventh aspect, alone or in combination with one or more of the first through tenth aspects, different SRS resources, of the number of SRS resources, occur in different slots, and the one or more SRSs are transmitted in the different SRS resources using different SRS ports.

In a twelfth aspect, alone or in combination with one or more of the first through eleventh aspects, process 900 includes receiving an indication of whether to transmit an RI report, and selectively transmitting the RI report based at least in part on the indication.

In a thirteenth aspect, alone or in combination with one or more of the first through twelfth aspects, the indication indicates that the RI report is to be transmitted when one or more SRS symbols overlap with one or more physical uplink control channel symbols, or that the RI report is not to be transmitted when SRS symbols do not overlap with physical uplink control channel symbols.

In a fourteenth aspect, alone or in combination with one or more of the first through thirteenth aspects, one or more muted SRS resources are used to transmit an uplink communication other than an SRS when the actual number of SRS ports is less than the maximum number of SRS ports and the UE is configured to transmit a rank indicator report.

In a fifteenth aspect, alone or in combination with one or more of the first through fourteenth aspects, the actual number of SRS ports is equal to a maximum value of the maximum number of SRS ports and the RI value.

In a sixteenth aspect, alone or in combination with one or more of the first through fifteenth aspects, SRS transmission is repeated on one or more SRS ports if the actual number of SRS ports is equal to the maximum number of SRS ports.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
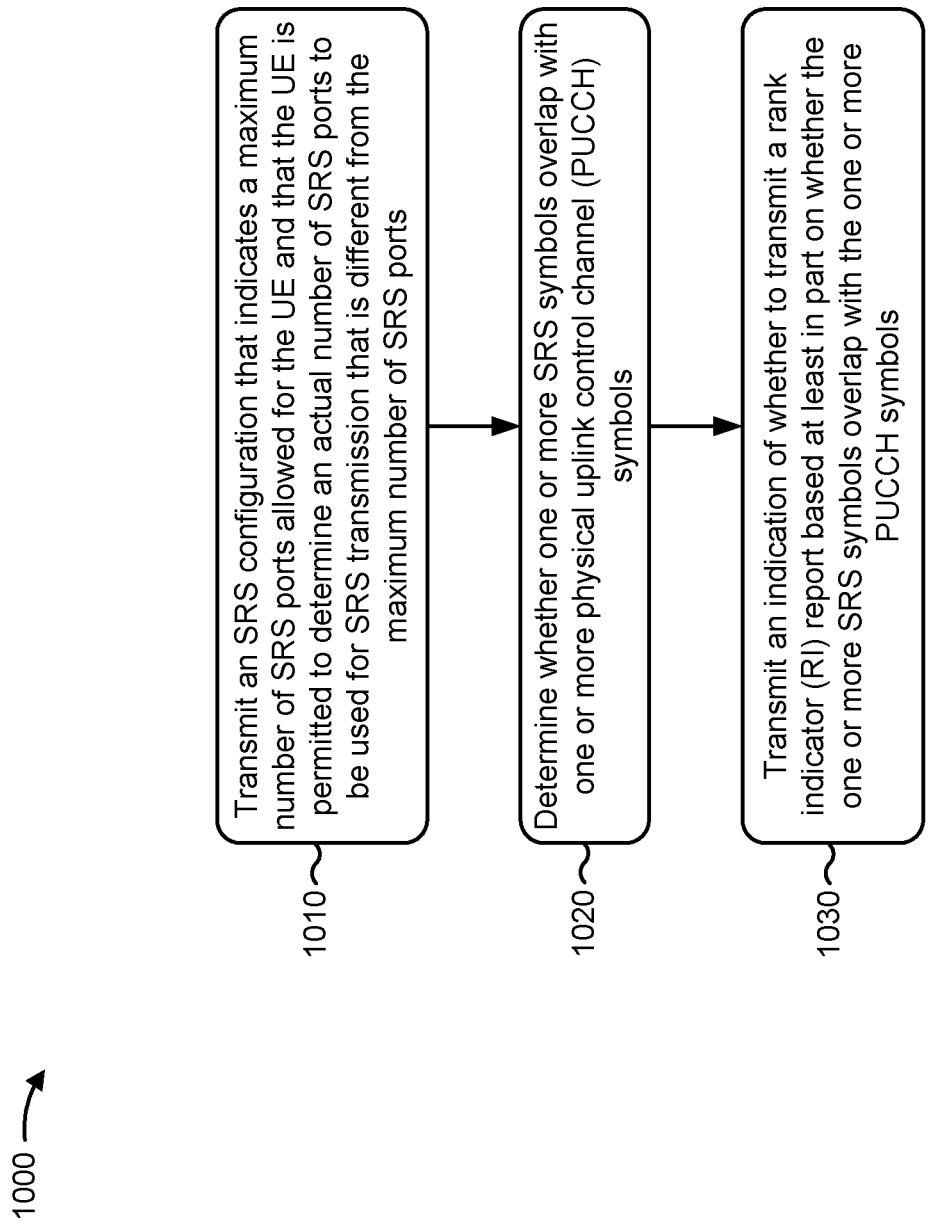

FIG. 10 is a diagram illustrating an example process 1000 performed, for example, by a base station, in accordance with various aspects of the present disclosure. Example process 1000 is an example where a base station (e.g., base station 110 and/or the like) performs operations associated with adaptive sounding reference signal port configuration.

As shown in FIG. 10, in some aspects, process 1000 may include transmitting, to a UE, an SRS configuration that indicates a maximum number of SRS ports allowed for the UE and that the UE is permitted to determine an actual number of SRS ports to be used for SRS transmission that is different from the maximum number of SRS ports (block 1010). For example, the base station (e.g., using transmit processor 220, controller/processor 240, memory 242, and/or the like) may transmit, to a UE, an SRS configuration that indicates a maximum number of SRS ports allowed for the UE and that the UE is permitted to determine an actual number of SRS ports to be used for SRS transmission that is different from the maximum number of SRS ports, as described above.

As further shown in FIG. 10, in some aspects, process 1000 may include determining whether one or more SRS symbols overlap with one or more physical uplink control channel (PUCCH) symbols (block 1020). For example, the base station (e.g., using transmit processor 220, receive processor 238, controller/processor 240, memory 242, and/or the like) may determine whether one or more SRS symbols overlap with one or more PUCCH symbols, as described above.

As further shown in FIG. 10, in some aspects, process 1000 may include transmitting, to the UE, an indication of whether to transmit an RI report based at least in part on whether the one or more SRS symbols overlap with the one or more PUCCH symbols (block 1030). For example, the base station (e.g., using transmit processor 220, controller/processor 240, memory 242, and/or the like) may transmit, to the UE, an indication of whether to transmit an RI report based at least in part on whether the one or more SRS symbols overlap with the one or more PUCCH symbols, as described above.

Process 1000 may include additional aspects, such as any single aspect or any combination of aspects described below and/or in connection with one or more other processes described elsewhere herein.

In a first aspect, process 1000 includes determining an RI value based at least in part on the actual number of SRS ports used for SRS transmissions by the UE when the indication indicates not to transmit the RI report.

In a second aspect, alone or in combination with the first aspect, the RI value is equal to the actual number of SRS ports.

In a third aspect, alone or in combination with one or more of the first and second aspects, the indication indicates not to transmit the RI report based at least in part on a determination that the one or more SRS symbols and the one or more PUCCH symbols do not overlap.

In a fourth aspect, alone or in combination with one or more of the first through third aspects, the indication indicates to transmit the RI report based at least in part on a determination that the one or more SRS symbols and the one or more PUCCH symbols overlap.

In a fifth aspect, alone or in combination with one or more of the first through fourth aspects, the indication indicates not to transmit the RI report based at least in part on a determination that the one or more SRS symbols are configured on a first carrier and the one or more PUCCH symbols are configured on a second carrier.

In a sixth aspect, alone or in combination with one or more of the first through fifth aspects, the indication indicates not to transmit the RI report based at least in part on a determination that the one or more SRS symbols and the one or more PUCCH symbols occur on non-overlapping symbols of a same carrier.

In a seventh aspect, alone or in combination with one or more of the first through sixth aspects, the indication indicates to transmit the RI report based at least in part on a determination that the one or more SRS symbols and the one or more PUCCH symbols occur on overlapping symbols of a same carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a sounding reference signal (SRS) configuration that indicates a maximum number of SRS ports and indicates, based at least in part on a value of a bit in the SRS configuration, whether the UE is permitted to determine an actual number of SRS ports to be used for SRS transmission that is different from the maximum number of SRS ports;
   determining the actual number of SRS ports to be used for SRS transmission based at least in part on the SRS configuration; and
   transmitting one or more SRSs using the actual number of SRS ports that is different from the maximum number of SRS ports indicated in the SRS configuration.

2. The method of claim 1, wherein the actual number of SRS ports is equal to a configured number of SRS ports for an SRS resource set, indicated in the SRS configuration, if the UE is not permitted to determine an actual number of SRS ports that is different from the maximum number of SRS ports.

3. The method of claim 1, wherein the actual number of SRS ports is determined based at least in part on the maximum number of SRS ports and a rank indicator (RI) value determined by the UE.

4. The method of claim 3, wherein the actual number of SRS ports is equal to a minimum value of the maximum number of SRS ports and the RI value.

5. The method of claim 3, wherein the actual number of SRS ports is equal to a maximum value of the maximum number of SRS ports and the RI value.

6. The method of claim 1, wherein the one or more SRSs are transmitted using a same transmit power for each of the actual number of ports.

7. The method of claim 1, wherein SRS transmission is muted on one or more SRS ports if the actual number of SRS ports is less than the maximum number of SRS ports.

8. The method of claim 1, wherein SRS transmission is repeated on one or more SRS ports if the actual number of SRS ports is equal to the maximum number of SRS ports.

9. The method of claim 1, wherein a UE capability indicates that a number of transmit antennas of the UE is equal to a number of receive antennas of the UE, and wherein the maximum number of SRS ports is equal to the number of transmit antennas and is equal to the number of receive antennas.

10. The method of claim 1, wherein the maximum number of SRS ports is indicated using a number of SRS ports parameter for an SRS resource.

11. The method of claim 10, wherein the actual number of SRS ports is less than or equal to the number of SRS ports parameter for the SRS resource.

12. The method of claim 1, wherein a UE capability indicates that a number of transmit antennas of the UE is less than a number of receive antennas of the UE, and wherein the UE is configured with a number of SRS resources, in an SRS resource set, that is equal to the maximum number of SRS ports.

13. The method of claim 12, wherein different SRS resources, of the number of SRS resources, occur in different symbols of a same slot, and wherein the one or more SRSs are transmitted in the different SRS resources using different SRS ports.

14. The method of claim 12, wherein different SRS resources, of the number of SRS resources, occur in different slots, and wherein the one or more SRSs are transmitted in the different SRS resources using different SRS ports.

15. The method of claim 1, further comprising receiving an indication of whether to transmit a rank indicator (RI) report and selectively transmitting the RI report based at least in part on the indication.

16. The method of claim 15, wherein the indication indicates that the RI report is to be transmitted when one or more SRS symbols overlap with one or more physical uplink control channel symbols, or that the RI report is not to be transmitted when SRS symbols do not overlap with physical uplink control channel symbols.

17. The method of claim 1, wherein one or more muted SRS resources are used to transmit an uplink communication other than an SRS when the actual number of SRS ports is less than the maximum number of SRS ports and the UE is configured to transmit a rank indicator report.

18. A method of wireless communication performed by a network entity, comprising:
   transmitting, to a user equipment (UE), a sounding reference signal (SRS) configuration that indicates a maximum number of SRS ports allowed for the UE and indicates, based at least in part on a value of a bit in the SRS configuration, that the UE is permitted to determine an actual number of SRS ports to be used for SRS transmission that is different from the maximum number of SRS ports;
   determining, based at least in part on the SRS configuration, whether one or more SRS symbols overlap with one or more physical uplink control channel (PUCCH) symbols; and
   transmitting, to the UE, an indication of whether to transmit a rank indicator (RI) report based at least in part on whether the one or more SRS symbols overlap with the one or more PUCCH symbols.

19. The method of claim 18, further comprising determining an RI value based at least in part on the actual number of SRS ports used for SRS transmissions by the UE when the indication indicates not to transmit the RI report.

20. The method of claim 19, wherein the RI value is equal to the actual number of SRS ports.

21. The method of claim 18, wherein the indication indicates not to transmit the RI report based at least in part on a determination that the one or more SRS symbols and the one or more PUCCH symbols do not overlap.

22. The method of claim 18, wherein the indication indicates to transmit the RI report based at least in part on a determination that the one or more SRS symbols and the one or more PUCCH symbols overlap.

23. The method of claim 18, wherein the indication indicates not to transmit the RI report based at least in part on a determination that the one or more SRS symbols are configured on a first carrier and the one or more PUCCH symbols are configured on a second carrier.

24. The method of claim 18, wherein the indication indicates not to transmit the RI report based at least in part on a determination that the one or more SRS symbols and the one or more PUCCH symbols occur on non-overlapping symbols of a same carrier.

25. The method of claim 18, wherein the indication indicates to transmit the RI report based at least in part on a determination that the one or more SRS symbols and the one or more PUCCH symbols occur on overlapping symbols of a same carrier.

26. A user equipment (UE) for wireless communication, comprising:
one or more memories; and
one or more processors operatively coupled to the one or more memories, the one or more memories and the one or more processors configured to:
receive a sounding reference signal (SRS) configuration that indicates a maximum number of SRS ports and indicates, based at least in part on a value of a bit in the SRS configuration, whether the UE is permitted to determine an actual number of SRS ports to be used for SRS transmission that is different from the maximum number of SRS ports;
determine the actual number of SRS ports to be used for SRS transmission based at least in part on the SRS configuration; and
transmit one or more SRSs using the actual number of SRS ports that is different from the maximum number of SRS ports indicated in the SRS configuration.

27. The UE of claim 26, wherein the actual number of SRS ports is equal to a configured number of SRS ports for an SRS resource set, indicated in the SRS configuration, if the UE is not permitted to determine an actual number of SRS ports that is different from the maximum number of SRS ports.

28. The UE of claim 26, wherein the actual number of SRS ports is determined based at least in part on the maximum number of SRS ports and a rank indicator (RI) value determined by the UE.

29. The UE of claim 26, wherein the one or more SRSs are transmitted using a same transmit power for each of the actual number of ports.

30. A network entity for wireless communication, comprising:
one or more memories; and
one or more processors operatively coupled to the one or more memories, the one or more memories and the one or more processors configured to:
transmit, to a user equipment (UE), a sounding reference signal (SRS) configuration that indicates a maximum number of SRS ports allowed for the UE and indicates, based at least in part on a value of a bit in the SRS configuration, that the UE is permitted to determine an actual number of SRS ports to be used for SRS transmission that is different from the maximum number of SRS ports;
determine, based at least in part on the SRS configuration, whether one or more SRS symbols overlap with one or more physical uplink control channel (PUCCH) symbols; and
transmit, to the UE, an indication of whether to transmit a rank indicator (RI) report based at least in part on whether the one or more SRS symbols overlap with the one or more PUCCH symbols.

* * * * *